United States Patent
Knowles et al.

(10) Patent No.: US 9,879,637 B2
(45) Date of Patent: Jan. 30, 2018

(54) COMBINED FAN BYPASS COMPONENTS WITH REMOVABLE FRONT FRAME STRUCTURE FOR USE IN A TURBOFAN ENGINE AND METHOD FOR MAKING SAME

(71) Applicant: HONEYWELL INTERNATIONAL INC., Morristown, NJ (US)

(72) Inventors: Mark Knowles, Mesa, AZ (US); Shawn Alstad, Peoria, AZ (US); Justin C. Mickelsen, Phoenix, AZ (US); Raymond Gage, Phoenix, AZ (US); Bill Russell Watson, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 540 days.

(21) Appl. No.: 14/560,521

(22) Filed: Dec. 4, 2014

(65) Prior Publication Data

US 2016/0160800 A1 Jun. 9, 2016

(51) Int. Cl.

| F02K 3/06 | (2006.01) |
|---|---|
| F01D 25/16 | (2006.01) |
| F01D 25/24 | (2006.01) |
| F01D 25/28 | (2006.01) |

(52) U.S. Cl.
CPC .............. *F02K 3/06* (2013.01); *F01D 25/162* (2013.01); *F01D 25/24* (2013.01); *F01D 25/28* (2013.01); F05D 2230/60 (2013.01); F05D 2300/121 (2013.01); F05D 2300/603 (2013.01)

(58) Field of Classification Search
CPC ...... F01D 25/24; F01D 25/243; F01D 25/246; F01D 25/28; F01D 25/162; F02K 3/06; F05D 2300/603; F05D 2300/121; F05D 2300/60

See application file for complete search history.

(56) References Cited

U.S. PATENT DOCUMENTS

| 7,914,256 B2 * | 3/2011 | Xie ........................ B29C 70/88 415/200 |
|---|---|---|
| 8,091,371 B2 * | 1/2012 | Durocher ................ F01D 9/065 415/213.1 |
| 8,092,169 B2 | 1/2012 | Cloft et al. |
| 8,099,962 B2 | 1/2012 | Durocher et al. |
| 8,341,935 B2 | 1/2013 | Marques et al. |
| 2003/0185673 A1 * | 10/2003 | Matsumoto ............. F01D 5/282 415/159 |
| 2005/0022501 A1 | 2/2005 | Eleftheriou et al. |
| 2009/0180872 A1 * | 7/2009 | Lundgren ............. F01D 25/145 415/215.1 |
| 2014/0186167 A1 | 7/2014 | Liles et al. |

FOREIGN PATENT DOCUMENTS

| WO | 2013165505 A2 | 11/2013 |
|---|---|---|
| WO | 2014151097 A1 | 9/2014 |

OTHER PUBLICATIONS

Extended EP Search Report for Application No. 15196900.3-1607 dated Jun. 4, 2016.

* cited by examiner

*Primary Examiner* — Richard Edgar
(74) *Attorney, Agent, or Firm* — Lorenz & Kopf, LLP (57) ABSTRACT

A system and method is provided that combines fan bypass components and minimizes assembly interfaces in a turbofan engine. The system and method provide a front frame structure of reduced weight that slidably installs/removes from within the combined fan bypass components.

10 Claims, 7 Drawing Sheets

COMBINED FAN BYPASS COMPONENTS WITH REMOVABLE FRONT FRAME STRUCTURE FOR USE IN A TURBOFAN ENGINE AND METHOD FOR MAKING SAME

TECHNICAL FIELD

The present invention generally relates to turbofan engines, and more particularly relates to combining fan bypass components with a front frame in a system suitable for a turbofan engine.

BACKGROUND

A significant factor in aircraft engine competitiveness is the maximum thrust-to-weight ratio that an aircraft turbofan engine provides while remaining safely mounted to the aircraft and providing safe operation. The thrust-to-weight ratio can be improved by reducing the overall turbofan engine weight without affecting the engine thrust. Therefore, identifying contributors to overall turbofan engine weight that may be redesigned while maintaining safe turbofan engine operation is desirable.

One contributor to overall turbofan engine weight is the multiple assembly interfaces, and another contributor is the front frame structure. Externally, an aircraft turbofan engine generally appears as an aerodynamically streamlined outer covering surrounding the bulk of the aircraft engine core. Internally, an aircraft turbofan engine typically includes multiple stages of components coupled via multiple assembly interfaces.

Each assembly interface generally comprises two opposing flanges bolted together. The interfaces increase manufacture and assembly time, disrupt engine airflow and increase overall turbofan engine weight. Manufacture and assembly time is increased due to the additional piloting features and the associated tight manufacturing tolerances generally required for proper alignment. Even with proper alignment, each assembly interface introduces a step and/or gap that is disruptive to the airflow that occurs through stages of components referred to as "fan bypass components" (hereinafter referred to as the "bypass"). Each interface introduces additional material and components, contributing to the overall turbofan engine weight and cost.

The front frame structure is a significant contributor to overall turbofan engine weight. The front frame structure is located forward of, and coaxial with, the turbofan engine core, and satisfies several purposes; two purposes of the front frame structure are directing air and providing structural strength. As an aerodynamic turbofan engine component, the front frame structure, located within the bypass, is designed to split incoming air (generally from a fan assembly) and direct it into either the engine core or the bypass. As a structural support, the front frame structure provides structural strength for attaching the engine to the aircraft, and for supporting the majority of engine-to-aircraft weight. Due to the extensive structural and weight-bearing duties of the front frame structure, it is typically formed with heavy, integrated, circumferential rings requiring complex manufacturing techniques and installation procedures.

Accordingly, an architectural design improvement that combines fan bypass components and the front frame structure is desirable. The desired system and method combines fan bypass components and minimizes assembly interfaces in a turbofan engine. The desired system and method further provides a front frame structure of reduced weight that slidably installs/removes from within the combined fan bypass components.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

In view of the foregoing, a fan bypass assembly for use in a turbofan engine is provided. The fan bypass assembly comprises a cylindrical, single-piece bypass structure coaxial with an engine centerline and a front frame structure. The front frame structure is coaxial with the engine centerline and configured to slidably install within the single-piece bypass structure.

A method for reducing turbofan engine weight is also provided. The method comprises (1) manufacturing a cylindrical single-piece bypass structure, (2) aligning the single-piece bypass structure coaxially with an engine centerline, and (3) slidably installing a front frame structure coaxially within the single-piece bypass structure.

Another fan bypass assembly for use in a turbofan engine is provided. The fan bypass assembly comprises a front frame structure having a plurality of centering lugs extending radially therefrom. The fan bypass assembly also comprises a cylindrical single-piece bypass structure coaxially aligned with the engine centerline, the cylindrical single-piece bypass structure comprising an inner surface and configured to slidably and coaxially receive the front frame structure therein.

Other desirable features and advantages will become apparent from the following detailed description and the appended claims, taken in conjunction with the accompanying drawings and this background.

BRIEF DESCRIPTION OF THE DRAWINGS

A more complete understanding of the subject matter may be derived by referring to the following Detailed Description and Claims when considered in conjunction with the following figures, wherein like reference numerals refer to similar elements throughout the figures, and wherein:

DETAILED DESCRIPTION

The following Detailed Description is merely exemplary in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over any other implementations. Furthermore, there is no intention to be bound by any expressed or implied theory presented in the preceding Technical Field, Background, Brief Summary or the following Detailed Description.

For the sake of brevity, functional aspects of various turbofan engine systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The following descriptions may refer to elements or features being "coupled" together. As used herein, unless expressly stated otherwise, "coupled" means that one element/node/feature is directly or indirectly joined to, mated with, or directly or indirectly communicates with, another element/node/feature; coupling is not necessarily mechanical. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

In this document, relational terms, such as first and second, may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Various embodiments are directed to combined fan bypass components with a front frame structure designed to be slidably installed therein, and methods for producing the same. The embodiments described herein are merely an example and serve as a guide for implementing the novel systems and method herein on any industrial, commercial, or consumer turbofan application. As such, the examples presented herein are intended as non-limiting.

Figure 1:
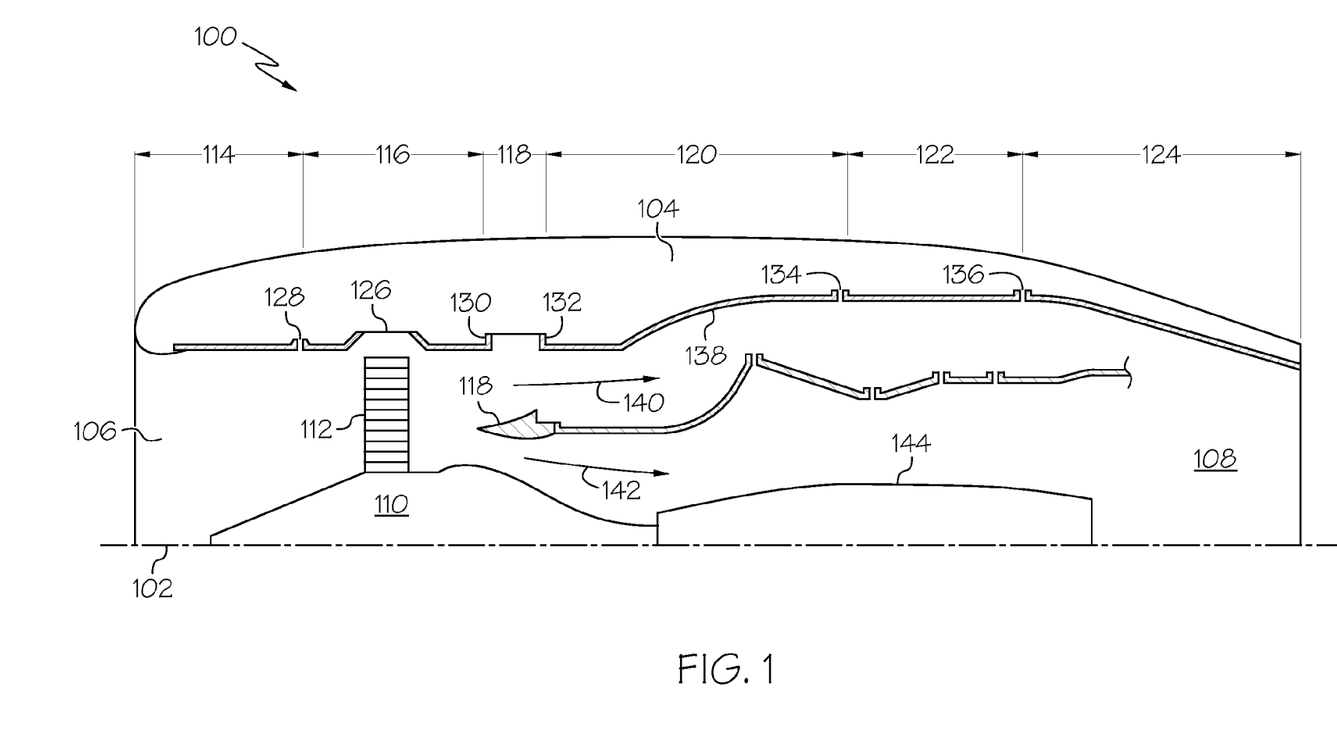
FIG. 1 is a longitudinal cross-sectional view of a front portion of a traditional turbofan engine.

FIG. 1 is a longitudinal cross-sectional view of a front portion of a traditional turbofan engine 100. The turbofan engine 100 provides the propulsion for the aircraft. Only the upper half of the engine, delineated by engine centerline 102, is shown for clarity. An aerodynamically smooth outer covering 104 wraps around and substantially encases the turbofan engine core 144; it is wider at the front, or inlet end 106, and narrower at the back, or exhaust end 108. An engine fan assembly 110 is coaxial with the engine centerline 102, and includes a plurality of fan blades (only one of which is shown, blade 112). The engine fan assembly 110 is positioned for rotation such that the tips of fan blades are accommodated within a fan containment structure 126 that is positioned circumferentially around fan assembly 110.

The outer covering 104 obscures multiple stages of components (not shown to scale), a subset of which are referred to as the "bypass components," described hereinbelow. While some turbofan engines may have additional systems and components, the typical components within a turbofan engine (from forward to aft) include: inlet inner barrel 114, fan containment housing 116, front frame 118, forward bypass 120, aft bypass 122, and thrust reverser 124.

During assembly, the multiple stages of components are coupled together, creating a bypass inner surface 138 utilized to contain high speed, high volume bypass airflow 140. High speed, high volume airflow travels from the aft side of the fan assembly through the front frame 118 that splits and directs airflow into either bypass airflow 140, or engine core airflow 142. The multiple stages couple together at interface 128, 130, 132, 134, and 136; each interface is typically comprised of two opposing upturned flanges secured with bolts, spoolies and the like. As may be readily understood, each interface introduces additional weight, components, assembly time, machine costs, and etc. Each interface also introduces a step and/or gap in the bypass inner surface 138 that is disruptive to high speed and high volume bypass airflow 140.

As previously described, bypass airflow 140 is directed by the front frame 118 (shown only in cross section), which is a component having several purposes. As an aerodynamic component, the front frame 118 is designed to split incoming air (generally from a fan assembly 110). The front frame 118 also serves the purpose of providing the structural strength for supporting the majority of the turbofan engine weight and for coupling the turbofan engine to the aircraft.

Figure 2:
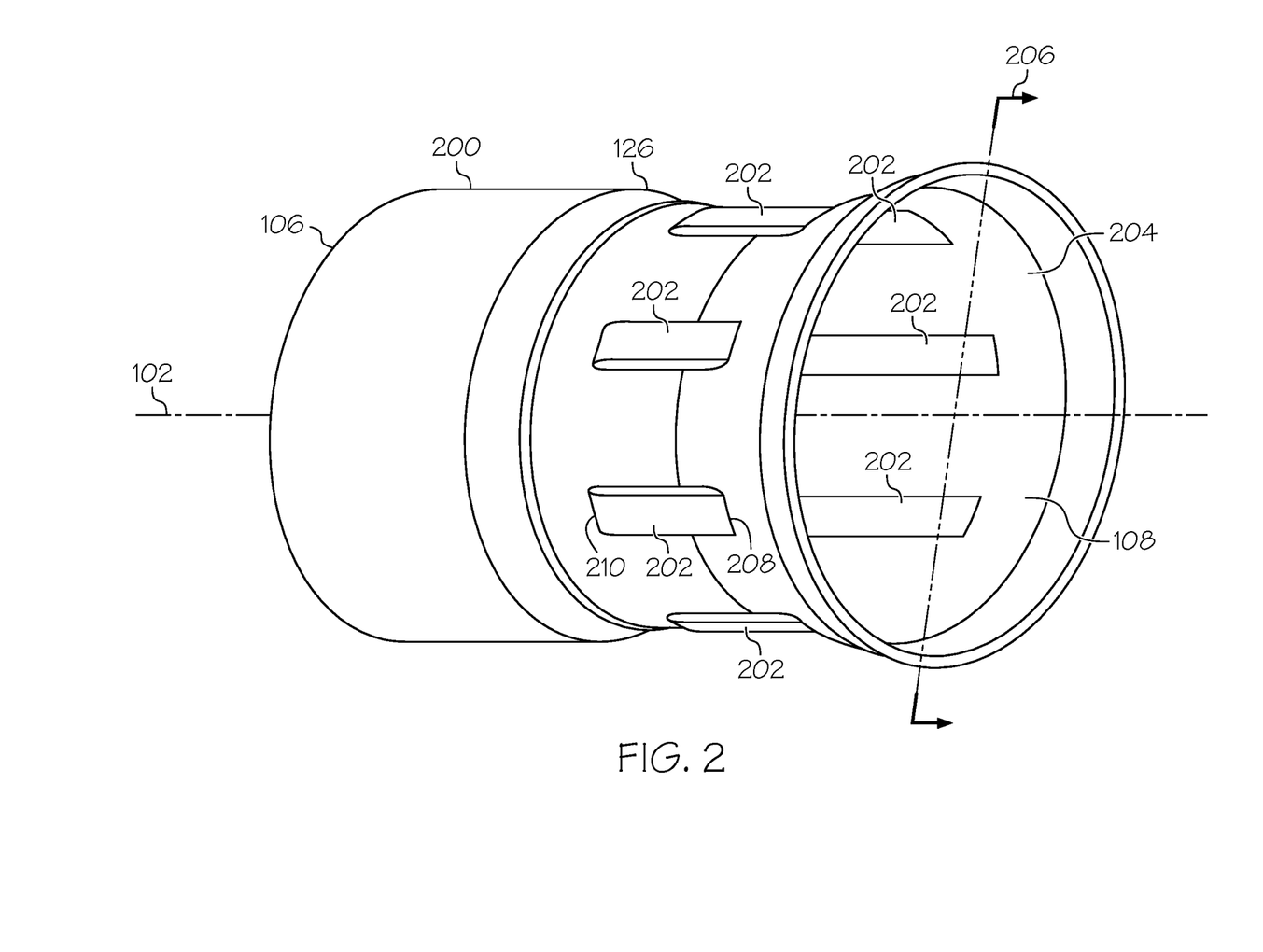
FIG. 2 is a three dimensional view of a bypass structure, in accordance with an exemplary embodiment.

FIG. 2 is a three dimensional view of a bypass structure 200, in accordance with an exemplary embodiment. The bypass structure 200 is a single-piece cylindrical component that is designed to be coaxial with engine centerline 102. Single-piece bypass structure 200 replaces the components that are generally referred to as the (fan) bypass components: fan containment housing 116, front frame 118, forward bypass 120, and aft bypass 122. Combining these components yields a single-piece structure having a bypass inner surface 204 without the gaps and steps associated with the multiple interfaces of a traditional turbofan engine. By reducing the number of stages of components and interfaces, bypass structure 200 may be manufactured with lighter weight materials, such as carbon fiber, and still meet its structural and performance requirements. Moreover, single-piece bypass structure 200 may be manufactured using techniques such as, but not limited to, filament winding, fiber placement, lathe production, casting, machining, and 3D printing.

The bypass inner surface 204 has a plurality of grooves 202 formed therein. The grooves are radially arranged and substantially parallel to the engine centerline 102. The grooves originate at 208, proximate the aft side of bypass structure 200 and terminate at 210, aft of the fan containment housing 116. When assembly is complete, the grooves 202 each receive a respective centering lug 308 (described in connection with FIG. 6 and FIG. 7).

Figure 3:
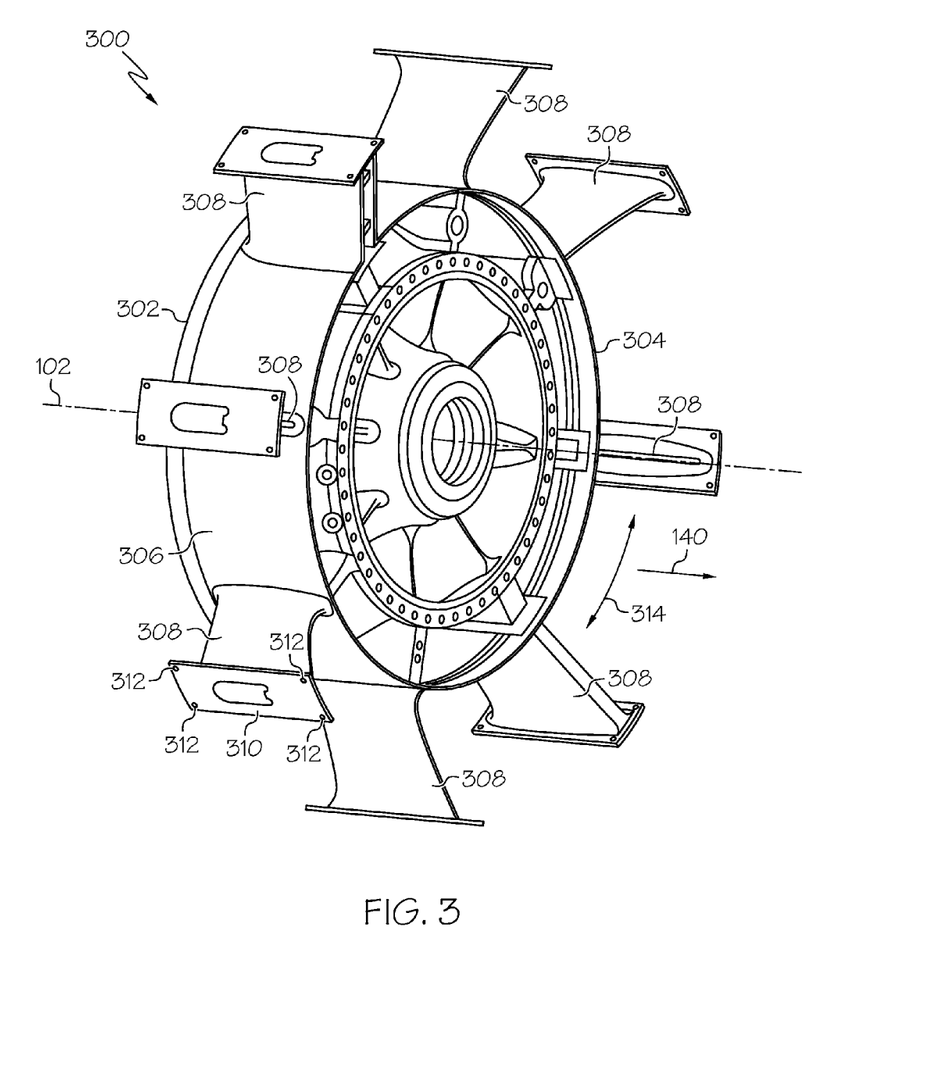
FIG. 3 is a three dimensional view of a removable front frame structure, in accordance with the exemplary embodiment.

FIG. 3 is a three dimensional view of a removable front frame structure 300, in accordance with the exemplary embodiment. The front frame structure 300 has a forward side 302 that faces incoming air, and an aft side 304. A plurality of centering lugs 308 extend from a circumferential surface 306. Each centering lug 308 extends radially from the circumferential surface 306, and terminates by forming a securing surface 310 that may accommodate one or more fasteners at fastening sites 312.

Figure 4:
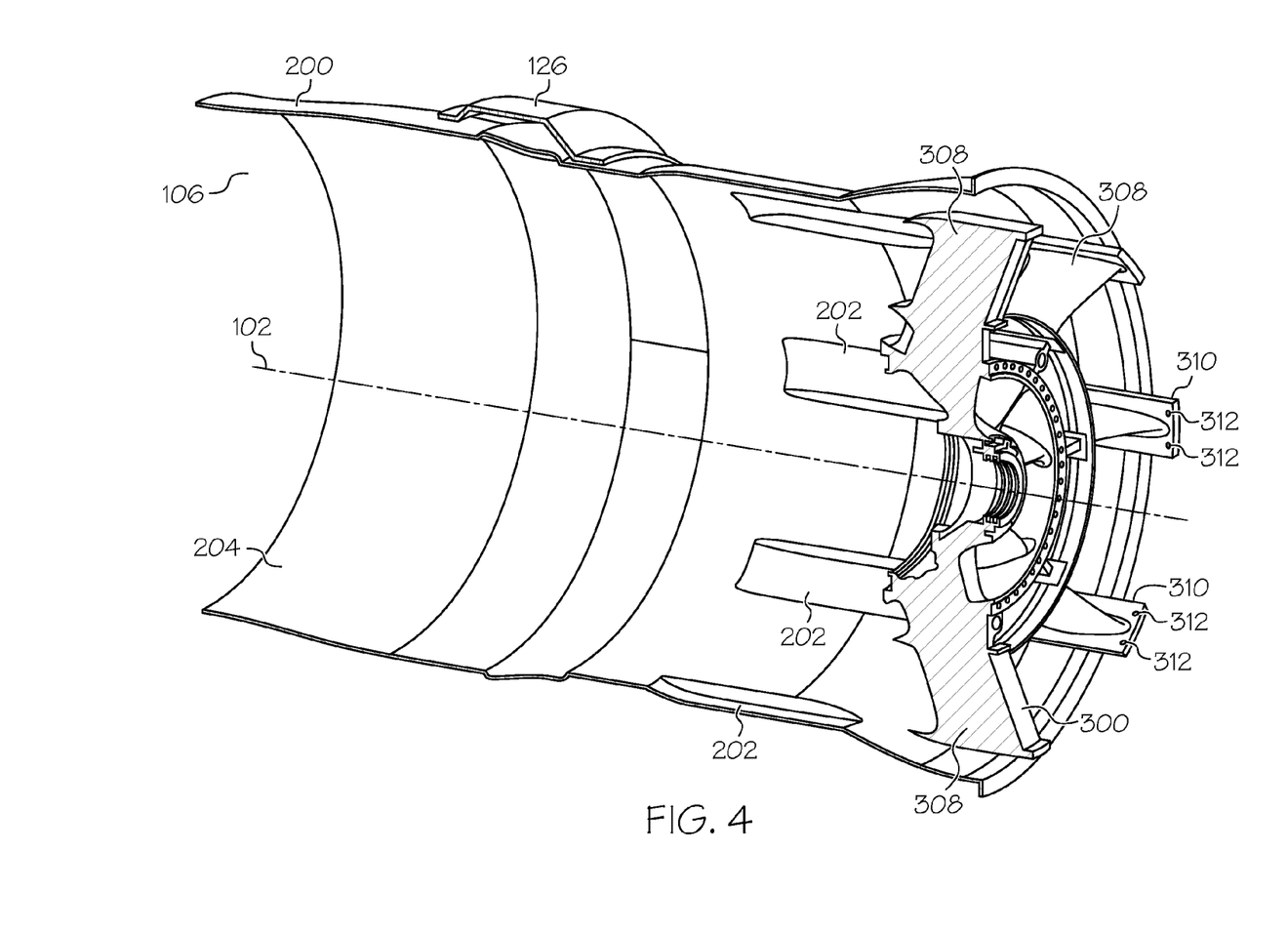
FIG. 4 is a view along a cutaway of FIG. 2 showing the front frame structure of FIG. 3 in a first stage of installation, in accordance with the exemplary embodiment.
Figure 5:
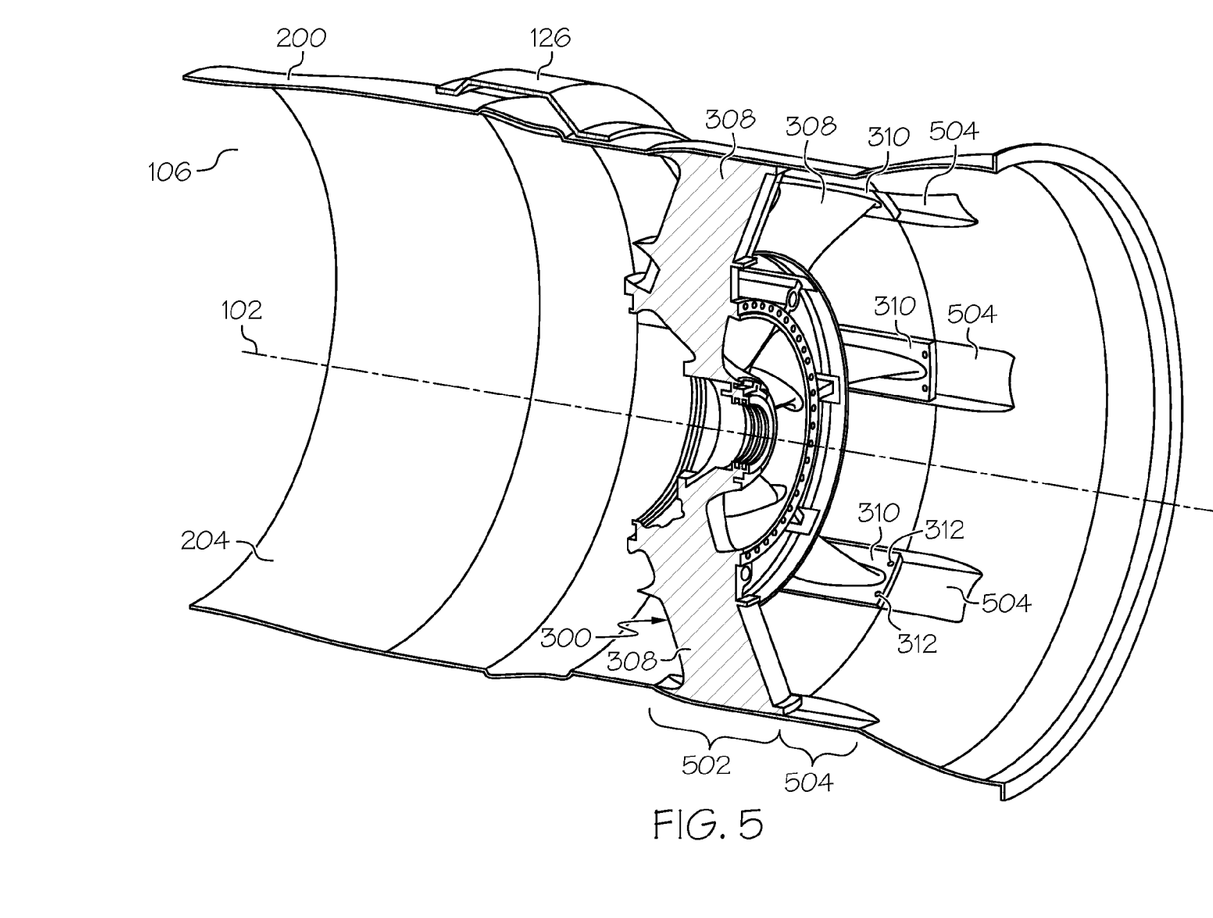
FIG. 5 is a view along a cutaway of FIG. 2 showing the front frame structure of FIG. 3 in a second stage of installation, in accordance with the exemplary embodiment.
Figure 6:
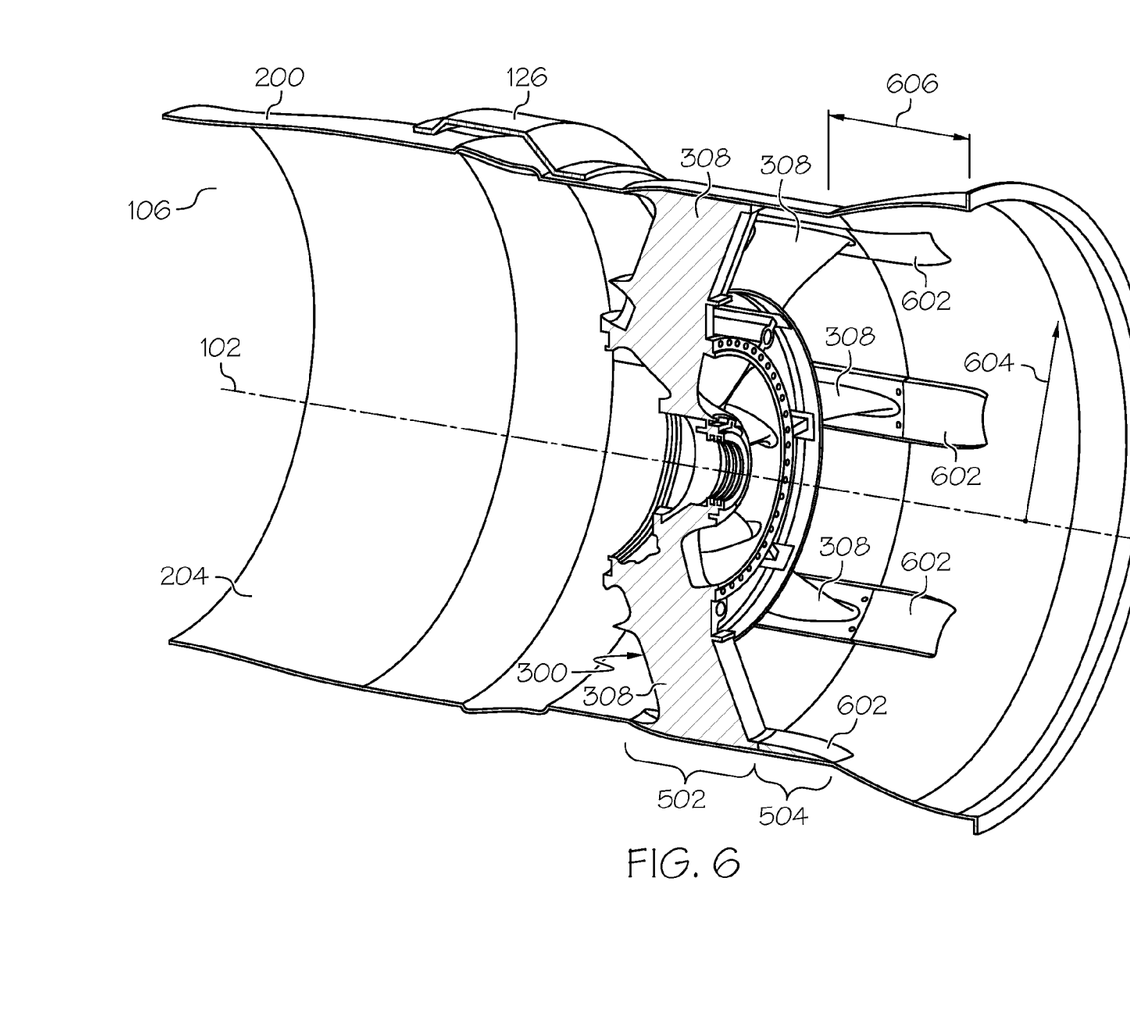
FIG. 6 is a view along a cutaway of FIG. 2 showing the front frame structure of FIG. 3 fully installed, in accordance with the exemplary embodiment.

The views presented in FIG. 4, FIG. 5, and FIG. 6, illustrate various stages of installation of the front frame structure 300 within the bypass structure 200. The front frame structure 300 slidably installs within (and removes from) the bypass structure 200 by aligning a securing surface 310 of a centering lug 308 with a respective groove 202, and sliding the front frame structure 300 toward the fan containment housing 116 until it comes to rest. When the front frame structure 300 is fully installed, the securing surface 310 of a centering lug 308 occupies a first portion (first portion 502 described in connection with FIG. 5) of a respective groove 202. Front frame structure 300 is similarly removable, advantageously reducing assembly time and disassembly time.

When front frame structure 300 is installed within the bypass structure 200, the forward side 302 faces the aft side of the fan assembly 110. The front frame structure 300 splits incoming air and directs bypass airflow 140. Bypass airflow 140 flows between centering lugs 308 (for example, in spaces 314). Front frame structure 300 is designed to meet all of the front frame requirements described hereinabove, with reduced weight and ease of assembly/disassembly. In the exemplary embodiment, the front frame structure 300 may be manufactured from a lightweight material such as aluminum, titanium, or the like.

FIG. 4 is a view along cutaway 206 of FIG. 2 showing the front frame structure 300 of FIG. 3 in a first stage of installation, in accordance with the exemplary embodiment. The cutaway 206 shows the front frame structure 300 positioned with the centering lugs 308 aligned with respective grooves 202 formed within bypass structure 200. As depicted, the front frame structure 300 is installed into the bypass structure 200 on the aft side of bypass structure 200. The securing surface 310 of each centering lug 308 is positioned for reception into a respective groove, and the front frame structure 300 is then slidably installed within bypass structure 200.

FIG. 5 is a view along cutaway 206 of FIG. 2 showing the front frame structure of FIG. 3 in a second stage of installation, in accordance with the exemplary embodiment. The cutaway 206 shows the front frame structure 300 after it has been partially installed, i.e., slid partially within bypass structure 200. The securing surface 310 of each centering lug 308 remains in the respective groove. Centering lugs 308, after being so aligned with respective grooves 202, continue to slide within the grooves 202 until the front frame structure 300 comes to rest at its final position, at which time the centering lugs occupy a first portion 502 (forward side) of a groove. A second portion 504 of each groove is unoccupied, thereby leaving remaining divots, referred to herein as a discontinuous region (region 606 described in connection with FIG. 6) of bypass inner surface 204.

FIG. 6 is a view along cutaway 206 of FIG. 2 showing the front frame structure of FIG. 3 fully installed, in accordance with the exemplary embodiment. The front frame structure 300 is at its final position, aft of the fan containment structure 126, after having been slidably installed. Generally, each of the divots, referred to as the second portion 504 of a respective groove 202, is filled with a plug 602. Specifically, each plug 602 has an inner surface (inner surface 702 of FIG. 7) that mates with the bypass inner surface 204 of bypass structure 200 in order to form a continuous bypass inner surface 204 of bypass structure 200. When the plugs 602 are fully installed, region 606 is a continuous surface with an inner surface radius 604 that may vary along engine centerline 102.

Figure 7:
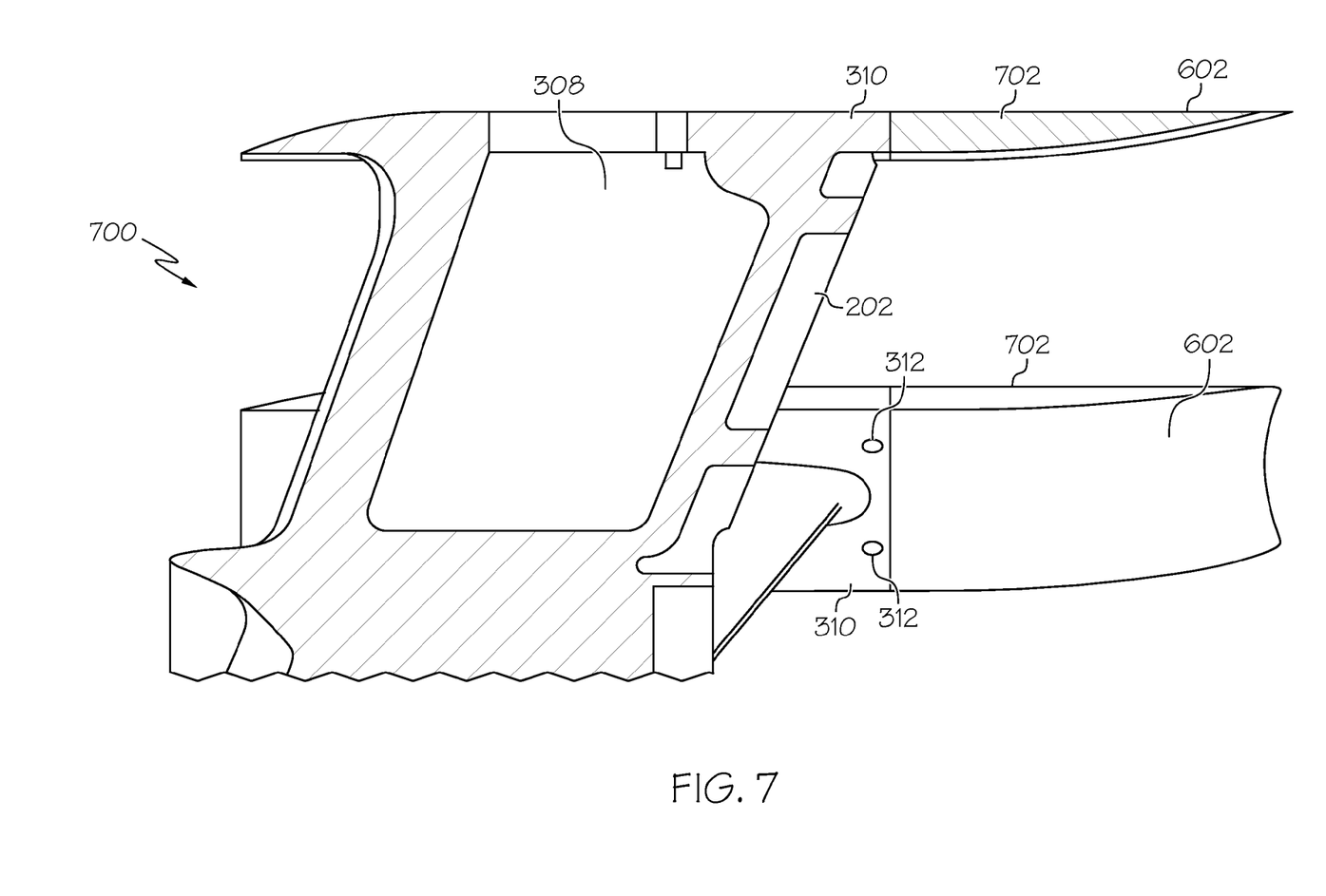
FIG. 7 is a three dimensional view showing a portion of the front frame structure of FIG. 3 with plugs attached, in accordance with the exemplary embodiment.

FIG. 7 is an expanded three dimensional view of a portion of the front frame structure of FIG. 3 with plugs 602 attached to securing surfaces 310. Fastening sites 312 may be utilized for coupling or fastening the respective components. As with the coupling of other components, mating the plugs 602 to the securing surfaces 310 of the centering lugs 308 and/or to the grooves 202 formed within bypass structure 200 may be accomplished by various means, for example, screws, bolts, fasteners, and the like, and may also employ compliant/elastomeric materials.

Thus, there has been provided a system and method that combines fan bypass components and minimizes assembly interfaces in a turbofan engine. The system and method provide a removable front frame structure of reduced weight that slidably installs and removes from within the combined fan bypass components.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A fan bypass assembly for use in a turbofan engine, the fan bypass assembly comprising:
   a cylindrical, single-piece, bypass structure configured to be coaxial with an engine centerline, the bypass structure comprising a bypass inner surface with a plurality of grooves formed therein, and wherein each groove has a first portion and a second portion; and
   a front frame structure configured to be coaxial with the engine centerline and to slidably install within the single-piece bypass structure, the front frame structure comprising a circumferential surface having a plurality of centering lugs extending radially therefrom;
   a plurality of plugs; and
   wherein each second portion of each groove is configured to receive a respective one of the plurality of plugs and each of the plurality of plugs has an inner surface configured to mate with the respective groove to thereby form a continuous bypass inner surface.

2. The fan bypass assembly of claim 1, wherein each first portion is configured to receive a respective one of the plurality of centering lugs.

3. The fan bypass assembly of claim 1, wherein the single-piece bypass structure is manufactured using one of, (1) filament winding, (2) fiber placement, (3) lathe production, (4) casting, (5) machining, and (6) 3D printing.

4. The fan bypass assembly of claim 1, wherein the single piece bypass structure comprises carbon fiber.

5. The fan bypass assembly of claim 1, wherein the front frame structure comprises one of aluminum or titanium.

6. A method for reducing turbofan engine weight, the method comprising:

manufacturing a cylindrical single-piece bypass structure configured to be coaxial with an engine centerline, and to have a bypass inner surface;

forming a plurality of grooves within the bypass inner surface, each of the plurality of grooves comprising a first portion and a second portion;

configuring each second portion to receive a respective one of a plurality of plugs therein;

for each of the plurality of grooves, mating a respective one of the plurality of plugs with a respective second portion, to thereby form a continuous bypass inner surface; and manufacturing a front frame structure configured to be coaxially aligned within the single-piece bypass structure, and to slidably install within the single-piece bypass structure.

7. The method of claim 6, wherein the front frame structure comprises a circumferential surface, and further comprising extending a plurality of centering lugs therefrom.

8. The method of claim 7, further comprising, for each first portion, receiving a respective one of the plurality of centering lugs therein.

9. A turbofan engine, comprising:

an engine core;

a front frame structure configured to be coaxially aligned with the engine core and having a plurality of centering lugs extending radially therefrom; and a cylindrical single-piece bypass structure configured to be coaxially aligned with the engine core, comprising an inner surface configured to slidably and coaxially receive the front frame structure therein, the inner surface comprising a plurality of grooves formed therein, each groove of the plurality of grooves comprising a first portion and a second portion; and a plurality of plugs, each plug of the plurality of plugs comprising an inner surface configured to mate with a respective second portion to thereby form a continuous bypass inner surface.

10. The fan bypass assembly of claim 9, wherein each first portion of each one of the plurality of grooves is configured to receive a respective one of the plurality of centering lugs.

* * * * *